(12) United States Patent
Sakuma et al.

(10) Patent No.: US 11,881,900 B2
(45) Date of Patent: Jan. 23, 2024

(54) TRANSCEIVER, SPATIAL LIGHT FREQUENCY TRANSMISSION SYSTEM AND SPATIAL LIGHT FREQUENCY TRANSMISSION METHOD

(71) Applicant: Nippon Telegraph and Telephone Corporation, Tokyo (JP)

(72) Inventors: Hiroki Sakuma, Musashino (JP); Kaoru Arai, Musashino (JP); Ryuta Sugiyama, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 80 days.

(21) Appl. No.: 17/777,313

(22) PCT Filed: Nov. 19, 2019

(86) PCT No.: PCT/JP2019/045306
§ 371 (c)(1),
(2) Date: May 17, 2022

(87) PCT Pub. No.: WO2021/100130
PCT Pub. Date: May 27, 2021

(65) Prior Publication Data
US 2022/0407607 A1 Dec. 22, 2022

(51) Int. Cl.
*H04B 10/50* (2013.01)
*H04B 10/67* (2013.01)
(Continued)

(52) U.S. Cl.
CPC ......... *H04B 10/675* (2013.01); *G02B 6/4286* (2013.01); *H04B 10/11* (2013.01);
(Continued)

(58) Field of Classification Search
CPC ...... H04B 10/11; H04B 10/501; H04B 10/67; H04B 10/675; H04B 10/572; H04B 2210/25; G02B 6/4286
(Continued)

(56) References Cited

U.S. PATENT DOCUMENTS 4,987,607 A * 1/1991 Gilbreath ........... H04B 10/1121
398/119
5,317,442 A * 5/1994 Sharp ................. H04B 10/1121
398/131
(Continued)

FOREIGN PATENT DOCUMENTS

JP H04355526 A * 12/1992 ............. H04B 10/07

OTHER PUBLICATIONS

Okamoto, "Optical Wiring Technology with Reconfigurable Self-Organization Waveguide," Telecom Frontier, 2012, retrieved from URL <http://www.scat.or.jp/frontier/frontier76/okamoto.pdf>, 76:1-12, 25 pages (with English Translation).
(Continued)

*Primary Examiner* — Li Liu
(74) *Attorney, Agent, or Firm* — Fish & Richardson P.C.

(57) ABSTRACT

A second transceiver (22) includes a guide light source (22c), a photorefractive crystal (22a), and a frequency control unit (22e). The guide light source (22c) emits guide light (Y3). A double phase conjugate mirror (22m) is formed in a crystal (22a) by scattering of reference signal light (Y1), which has a frequency different from that of the guide light and is incident on the crystal via space (15) after being transmitted from a first transceiver (21) which is a transceiver on the other side, and the guide light that is incident on the crystal in a reverse direction to that of the reference signal light. A frequency control unit (22e) couples the reference signal light emitted from the crystal (22a), which
(Continued)

is phase-conjugate light of the guide light generated by the mirror (22*m*), to an optical fiber (13*b*).

12 Claims, 7 Drawing Sheets

(51) Int. Cl.
*H04B 10/11* (2013.01)
*H04B 10/572* (2013.01)
*G02B 6/42* (2006.01)

(52) U.S. Cl.
CPC ........... *H04B 10/572* (2013.01); *H04B 10/67* (2013.01); *H04B 2210/25* (2013.01)

(58) Field of Classification Search
USPC .................. 398/119, 154, 158, 159, 162
See application file for complete search history.

(56) References Cited

U.S. PATENT DOCUMENTS

| | | | | |
|---|---|---|---|---|
| 6,281,994 B1* | 8/2001 | Horikoshi | ............ | G03H 1/2205 |
| | | | | 359/22 |
| 7,224,905 B2* | 5/2007 | Ruggiero | ........... | H04B 10/1121 |
| | | | | 398/119 |
| 2005/0259991 A1* | 11/2005 | Dudelzak | ................ | G01S 3/782 |
| | | | | 398/118 |
| 2022/0376783 A1* | 11/2022 | Sakuma | ............... | H04B 10/112 |

OTHER PUBLICATIONS

Yeh et al., "Model for mutually pumped phase conjugation," Journal of the Optical Society of America B, 1988, 5(8):1743-1749.

* cited by examiner

TRANSCEIVER, SPATIAL LIGHT FREQUENCY TRANSMISSION SYSTEM AND SPATIAL LIGHT FREQUENCY TRANSMISSION METHOD

CROSS-REFERENCE TO RELATED APPLICATIONS

This application is a National Stage application under 35 U.S.C. § 371 of International Application No. PCT/JP2019/045306, having an International Filing Date of Nov. 19, 2019. The disclosure of the prior application is considered part of the disclosure of this application, and is incorporated in its entirety into this application.

TECHNICAL FIELD

The present invention relates to a transceiver, a spatial light frequency transmission system, and a spatial light frequency transmission method for transmitting signal light of a reference optical frequency between separated transmitters and receivers via space.

BACKGROUND ART

Various fields such as scientific measurement, communication, and navigation require a technology for accurately transmitting reference frequency signals between transmitters and receivers that are separated from each other at remote locations or the like. In recent years, there have been optical frequency transmission systems (systems) that employ transmission of signal light (a main signal) of a reference optical frequency via space instead of transmission via optical fibers in order to expand the application range of frequency transmission technology.

However, in such a system, when a light wave which is a main signal is transmitted through space (the atmosphere), the refractive index distribution of the atmosphere may fluctuate temporally or vary spatially, such that atmospheric fluctuations occur. This causes a wavefront distortion that is an altered wavefront of light, the wavefront being perpendicular to the light beam. If wavefront distortions occur, the system may fail to operate normally.

Thus, there have been techniques of forming a double phase conjugate mirror (which will be described later) by a photorefractive crystal (also referred to as a crystal) which will be described later to perform wavefront correction for eliminating wavefront distortions of light waves. The photorefractive crystal has a medium such as $BaTiO_3$ (barium titanate) that produces a photorefractive effect in which the refractive index changes depending on the intensity of light irradiation.

Figure 6:
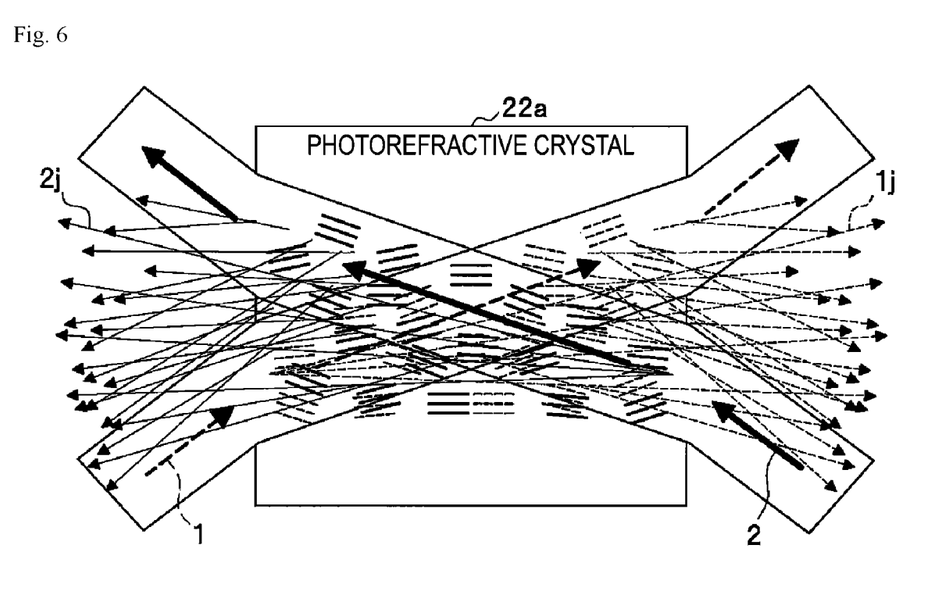
FIG. 6 is a diagram illustrating scattering in a photorefractive crystal due to signal light incident from opposite directions.
Figure 7:
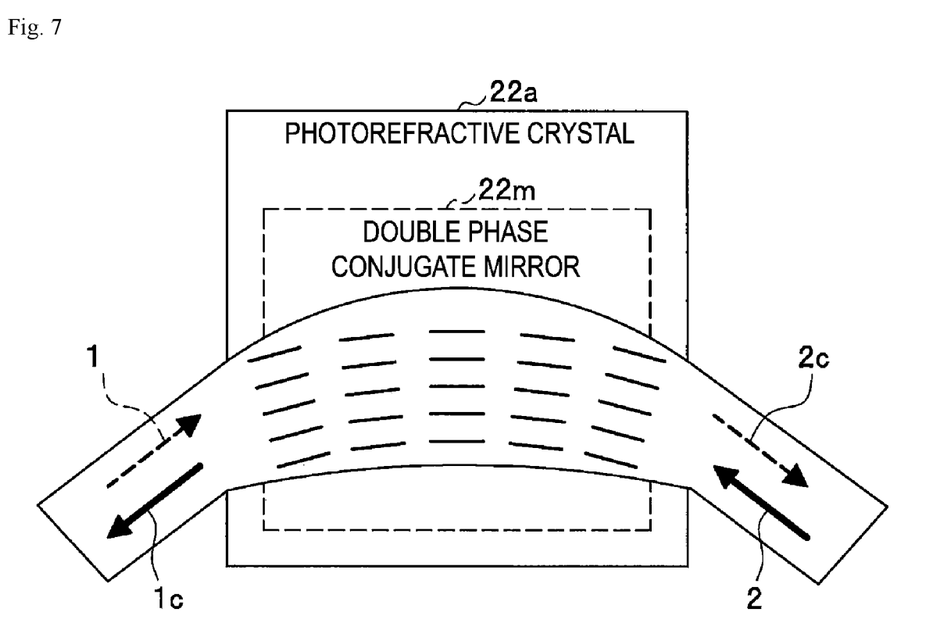
FIG. 7 is a diagram illustrating a double phase conjugate mirror formed in a photorefractive crystal by scattering of signal light incident from opposite directions and phase-conjugate light generated by the double phase conjugate mirror.

As illustrated in FIG. 6, when two light waves 1 and 2 are incident on a photorefractive crystal 22a from opposite directions, scattered light 1j and 2j is generated due to the beam fanning effect. As illustrated in FIG. 7, the scattered light 1j and 2j forms a double phase conjugate mirror 22m (also referred to as a mirror 22m) which is a diffraction grating. FIGS. 6 and 7 are the same as described in NPL 1.

The mirror 22m generates phase-conjugate light 1c and 2c as each of the light waves 1 and 2 from opposite directions follows the incident direction of the other light wave in its reverse direction. That is, the light wave 1 incident from the left side becomes phase-conjugate light 2c of the light wave 2 incident from the right side which follows the incident direction of the light wave 2 in its reverse direction due to the mirror 22m, which is then emitted from the crystal 22a. The light wave 2 from the right side becomes phase-conjugate light 1c of the light wave 1 incident from the left side which follows the incident direction of the light wave 1 in its reverse direction due to the mirror 22m, which is then emitted from the crystal 22a. In this case, the phase-conjugate light 1c that follows the light wave 1 in the reverse direction has the same wavefront as that of the light wave 1 but with the opposite propagation direction to that of the light wave 1. The phase-conjugate light 2c that follows the light wave 2 in the reverse direction has the same wavefront as that of the light wave 2 but with the opposite propagation direction to that of the light wave 2.

Here, it is assumed that a wavefront distortion has been caused to the light wave 1 to be incident on the crystal 22a due to an atmospheric fluctuation. The phase-conjugate light 1c associated with the light wave 1 having the wavefront distortion is emitted from the mirror 22m following the incident direction of the light wave 1 in the reverse direction. The phase-conjugate light 1c has the same wavefront distortion as the light wave 1. Because the phase-conjugate light 1c having the wavefront distortion passes through the same atmospheric fluctuation in the reverse direction to that of the light wave 1, the wavefront distortion of the phase-conjugate light 1c due to the atmospheric fluctuation is canceled out after passing through the atmospheric fluctuation, such that it returns to the original light wave 1 without wavefront distortions. In this way, wavefront correction can be performed by generating the phase-conjugate light 1c.

That is, the crystal 22a on which light waves are incident from opposite directions autonomously forms a mirror 22m therein by a refractive diffraction grating that detects the wavefront of incident light and gives optimum wavefront modulation to perform wavefront correction. Such types of technology include that described in NPL 2.

CITATION LIST

Non Patent Literature

NPL 1: Atsushi Okamoto, "Optical Wiring Technology with Reconfigurable Self-Organization Waveguide," [online], TELECOM FRONTIER No. 76 2012 SUMMER, [retrieved Nov. 18, 2019], Internet <URL: http://www.sca-t.or.jp/frontier/frontier76/okamoto.pdf> NPL 2: Pochi Yeh et al., "Model for mutually pumped phase conjugation," J. Opt. Soc. Am. B, Vol. 5, No. 8, pp. 1743-1748, August 1988.

SUMMARY OF THE INVENTION

Technical Problem

Forming the double phase conjugate mirror described above to perform wavefront correction requires light incident from opposite directions.

For example, a double phase conjugate mirror cannot be formed when only signal light from one direction, which is directed from the transmitting side toward the receiving side, is incident on the crystal. Thus, there are problems that not only wavefront correction of signal light incident from one direction cannot be performed, but also the signal light cannot be coupled to an optical fiber connected to the receiving side.

The present invention has been made in view of such circumstances and it is an object of the present invention to ensure that signal light from one direction which is directed from the transmitting side toward the receiving side can be coupled to an optical fiber on the receiving side and wavefront correction of the signal light can be performed.

Means for Solving the Problem

In order to solve the above problems, a transceiver of the present invention includes a guide light source configured to emit guide light, a photorefractive crystal in which a first double phase conjugate mirror is formed by scattering of reference signal light that has a frequency different from that of the guide light and is incident on the photorefractive crystal via a space after being transmitted from a transceiver on another side and the guide light that is incident on the photorefractive crystal in a reverse direction to that of the reference signal light, and a frequency control unit configured to couple the reference signal light emitted from the photorefractive crystal, which is phase-conjugate light of the guide light by the first double phase conjugate mirror, to an optical fiber.

Effects of the Invention

According to the present invention, signal light from one direction which is directed from the transmitting side toward the receiving side can be coupled to an optical fiber on the receiving side and wavefront correction of the signal light can be performed.

DESCRIPTION OF EMBODIMENTS

Hereinafter, embodiments of the present invention will be described with reference to the drawings. Components having corresponding functions are given the same reference signs in all drawings of the present specification and description thereof will be omitted as appropriate.

Configuration of First Embodiment

Figure 1:
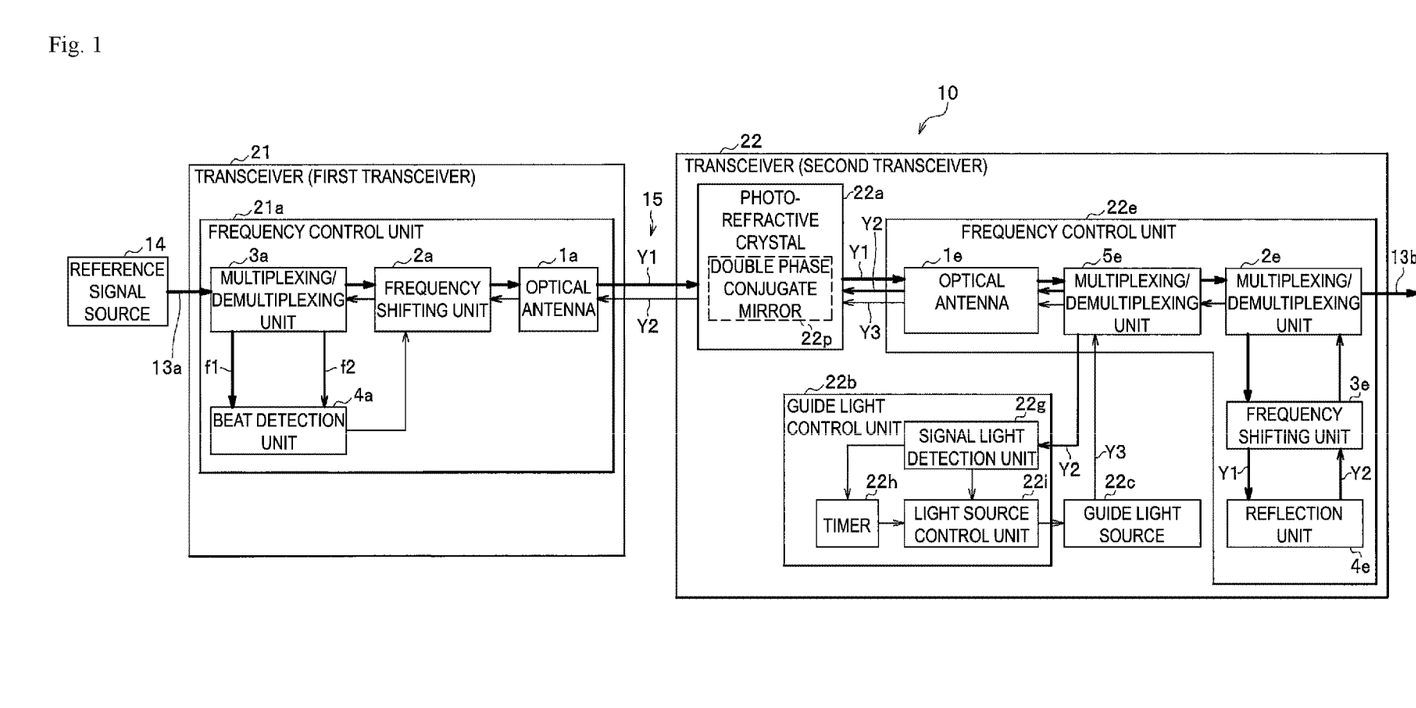
FIG. 1 is a block diagram illustrating a configuration of a spatial light frequency transmission system according to a first embodiment of the present invention.

FIG. 1 is a block diagram illustrating a configuration of a spatial light frequency transmission system according to a first embodiment of the present invention.

The spatial light frequency transmission system (also referred to as a system) 10 illustrated in FIG. 1 includes a transceiver 21 and a transceiver 22 that are separated from each other at remote locations or the like.

A reference signal source 14 such as a laser light source is connected to the transceiver 21 by an optical fiber 13a. The transceiver 21 transmits signal light of a reference optical frequency (also referred to as reference signal light) emitted from the reference signal source 14 to the transceiver 22 on the other side via space 15 as indicated by an arrow Y1. The transceiver 21 also receives, by a frequency control unit 21a, return signal light indicated by an arrow Y2 that the transceiver 22 on the other side has returned as will be described later. The frequency control unit 21a performs control for correcting frequency fluctuations. In the present example, emission will also be referred to as output and incidence will also be referred to as input.

The frequency control unit 21a couples the reference signal light to the optical fiber 13a and receives the return signal light (Y2) and is configured to include an optical antenna 1a, a frequency shifting unit 2a, a multiplexing/demultiplexing unit 3a, and a beat detection unit 4a. The optical antenna 1a, the frequency shifting unit 2a, the multiplexing/demultiplexing unit 3a, and the beat detection unit 4a are bidirectionally connected by optical fibers. However, an output end of the beat detection unit 4a for outputting a frequency difference (which will be described later) and a control end of the frequency shifting unit 2a are connected by an electrical signal line.

The multiplexing/demultiplexing units 3a and the multiplexing/demultiplexing units 5e and 2e may be beam splitters that reflect and transmit light waves.

The optical antenna 1a transmits the reference signal light to the transceiver 22 on the other side via the space 15 as indicated by the arrow Y1 and receives the return signal light indicated by the arrow Y2 from the transceiver 22 on the other side via the space 15.

The multiplexing/demultiplexing unit 3a splits and outputs reference signal light of a frequency f1 from the reference signal source 14 to the frequency shifting unit 2a and the beat detection unit 4a. Further, the multiplexing/demultiplexing unit 3a splits return signal light of a frequency f2, which has been received from the transceiver 22 on the other side via the optical antenna Ta and the frequency shifting unit 2a as indicated by the arrow Y2, and outputs the split light to the beat detection unit 4a.

The beat detection unit 4a obtains the frequency difference (beat frequency) between the frequency f1 of the reference signal light and the frequency f2 of the return signal light and outputs the frequency difference to the frequency shifting unit 2a.

The frequency shifting unit 2a frequency-shifts the return signal light input from the optical antenna Ta such that the frequency difference becomes a constant frequency (for example, 10 MHz). The frequency difference is made constant by repeating the feedback in which the frequency-shifted return signal light is input to the beat detection unit 4a via the multiplexing/demultiplexing unit 3a.

The transceiver 22 receives the reference signal light (Y1) transmitted from the transceiver 21. The transceiver 22 is configured to include a photorefractive crystal (also referred to as a crystal) 22a, a guide light control unit 22b, a guide light source 22c, and a frequency control unit 22e. The guide light control unit 22b includes a signal light detection unit 22g, a timer 22h, and a light source control unit 22i. The frequency control unit 22e includes an optical antenna 1e, a multiplexing/demultiplexing unit 2e, a frequency shifting unit 3e, and a reflection unit 4e. The frequency control unit 21e performs control for correcting frequency fluctuations.

The optical antenna 1e focuses the reference signal light (arrow Y1) received via the crystal 22a by a lens (not shown) and couples the focused light to the optical fiber 13b via the multiplexing/demultiplexing units 5e and 2e. The optical antenna 1e also transmits the return signal light (Y2) which will be described below to the space 15 via the crystal 22a.

The reflection unit 4e reflects the reference signal light (Y1), which has been output from the optical antenna 1e and demultiplexed by the multiplexing/demultiplexing unit 2e, to return the reference signal light (Y1) and outputs the return signal light (Y2) to the frequency shifting unit 3e.

The frequency shifting unit 3e frequency-shifts the return signal light by a small predetermined frequency difference (for example, 10 MHz) such that the return signal light can be distinguished from the reference signal light and outputs the frequency-shifted return signal light to the optical antenna 1e via the multiplexing/demultiplexing unit 2e.

The guide light source 22c is a laser light source or the like and emits guide light indicated by an arrow Y3 having a frequency different from that of the reference signal light or the return signal light. This guide light is demultiplexed by the multiplexing/demultiplexing unit 5e into the optical antenna 1e and is incident on the crystal 22a from the optical antenna 1e. The guide light is a light source that is incoherent with respect to the reference signal light or the return signal light.

Figure 2:
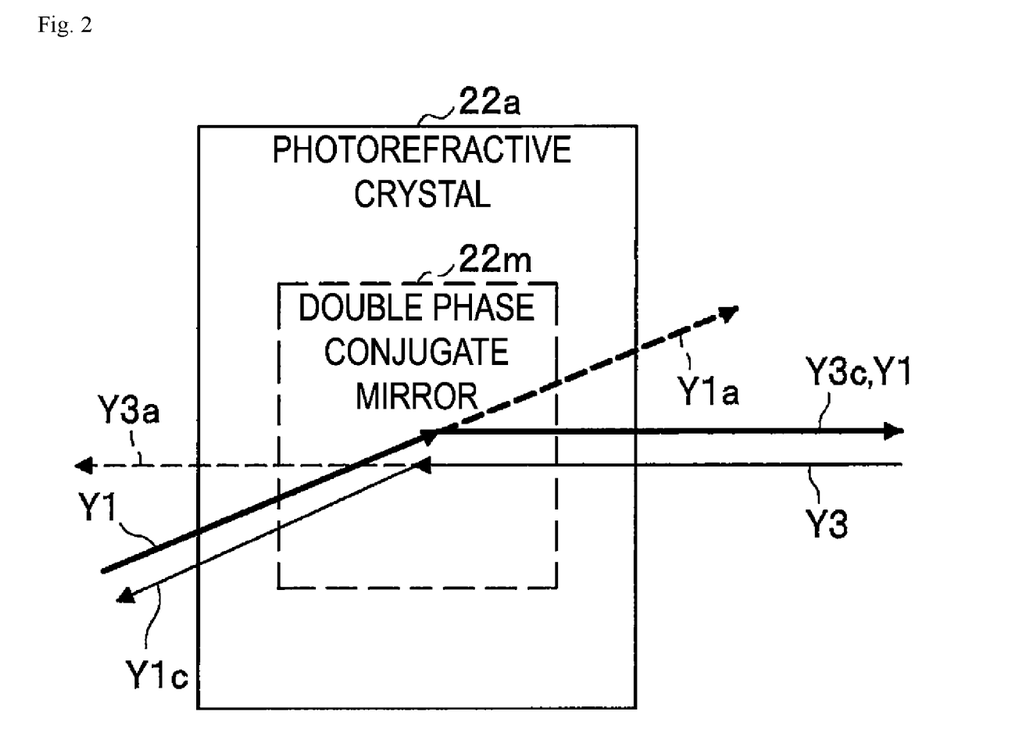
FIG. 2 is a diagram for explaining an operation in which a double phase conjugate mirror is formed in a photorefractive crystal by scattering of reference signal light and guide light.

Both light waves of the reference signal light indicated by the arrow Y1 received via the space 15 and the guide light indicated by the arrow Y3 from its reverse direction are incident on the photorefractive crystal 22a in opposite directions as illustrated in FIG. 2 according to the principle described above with reference to FIGS. 6 and 7. Due to the incidence of light waves in the opposite directions, both light waves generate scattered light in the crystal 22a and a double phase conjugate mirror (also referred to as a mirror) 22m is formed by a diffraction grating due to the beam fanning effect. The mirror 22m constitutes a first double phase conjugate mirror as described in the aspects.

The reference signal light (YT) is emitted to the optical antenna 1e (of FIG. 1) by the mirror 22m as phase-conjugate light (Y3c) of the guide light that follows the incident direction of the guide light (Y3) in its reverse direction. Because the phase-conjugate light (Y3c) is the same as the reference signal light, it will be referred to as reference signal light (YT).

The guide light (Y3) is emitted to the space 15 as phase-conjugate light (Y1c) of the reference signal light that follows the incident direction (YT) of the reference signal light in its reverse direction.

Even if either the reference signal light or the guide light is incident on the crystal 22a which is in a state with no mirror 22m formed (in an unformed state), no mirror 22m is formed. In this case, the reference signal light is emitted from the crystal 22a in a direction indicated by a dashed arrow Y1a, which is a straight line extension of the incident direction of the arrow YT. The direction indicated by the dashed arrow Y1a deviates from the direction toward the optical fiber 13b via a lens (not shown) of the optical antenna 1e illustrated in FIG. 1. Therefore, the reference signal light cannot be coupled to the optical fiber 13b. The guide light indicated by the arrow Y3 in FIG. 2 is emitted from the crystal 22a in a direction indicated by a dashed arrow Y3a which is a straight line extension of the incident direction.

Returning to FIG. 1, when the reference signal light (YT) that follows the guide light (Y3) in the reverse direction is incident on the optical antenna 1e from the crystal 22a as described above, the optical antenna 1e focuses and couples the reference signal light (YT) to the optical fiber 13b.

The focused reference signal light (YT) is split by the multiplexing/demultiplexing unit 2e via the multiplexing/demultiplexing unit 5e and reflected by the reflection unit 4e such that the reference signal light (YT) is returned. The return signal light (Y2) is frequency-shifted to a predetermined frequency slightly deviating from the frequency of the reference signal light by the frequency shifting unit 3e and is then incident on the crystal 22a from the optical antenna 1e via the multiplexing/demultiplexing units 2e and 5e.

The incident return signal light and the reference signal light that is incident from its reverse direction are scattered in the crystal 22a to form another double phase conjugate mirror 22p according to the same principle as that of the mirror 22m illustrated in FIG. 2. The return signal light is emitted from the crystal 22a by the mirror 22p as return signal light that is phase-conjugate light that follows the incident direction (YT) of the reference signal light in its reverse direction as indicated by an arrow Y2. The mirror 22p constitutes a second double phase conjugate mirror as described in the aspects.

When the mirror 22P is formed by both the reference signal light and the return signal light as described above, light waves generated by the mirror 22m (of FIG. 2) formed by the reference signal light and the guide light become a noise source. Thus, the guide light control unit 22b performs control for stopping the guide light as follows. That is, the signal light detection unit 22g of the guide light control unit 22b detects the return signal light (Y2) that is incident on the signal light detection unit 22g after being demultiplexed by the multiplexing/demultiplexing unit 5e. The light source control unit 22i stops the guide light source 22c to stop the guide light (Y3) when return signal light has been detected.

Even if the guide light is stopped in this way, the mirror 22p is still autonomously formed between the reference signal light and the return signal light after the guide light is stopped because the mirror 22p is already formed in the crystal 22a by both light waves of the reference signal light and the return signal light before the guide light is stopped. Therefore, even when the wavefront distortion of the reference signal light (Y1) has changed, the return signal light (Y2), which is phase-conjugate light that dynamically corrects the changed wavefront distortion, is output to the space 15 from the crystal 22a, following the incident path of the reference signal light in the reverse direction.

If the reference signal light (Y1) incident on the crystal 22a is cut off due to a cause such as obstruction of the optical path in the space 15, the diffraction grating that causes the mirror 22p to be formed in the crystal 22a is eliminated gradually and then eliminated completely after a certain time. After that, even if the reference signal light is restored and incident on the crystal 22a, no return signal light is incident because there are no mirrors 22m and 22p in the crystal 22a. At this time, guide light is not emitted either.

Therefore, when the reference signal light (Y1) is cut off, the guide light control unit 22b performs control for generating guide light as follows. That is, when the return signal light (Y2) has remained undetected by the signal light detection unit 22g for a predetermined time, the light source control unit 22i activates the guide light source 22c to generate guide light (Y3). The generated guide light is split by the multiplexing/demultiplexing unit 5e and incident on the crystal 22a via the optical antenna 1e.

The above predetermined time during which the return signal light (Y2) remains undetected is a period of time from when the signal light detection unit 22g fails to detect the return signal light to when the mirror 22p in the crystal 22a is eliminated completely. The timer 22h measures the time during which the return signal light remains undetected by the signal light detection unit 22g, and when the measured time has reached the predetermined time, the light source control unit 22i determines that the return signal light has remained undetected for the predetermined time and activates the guide light source 22c.

In this state, when the reference signal light is restored and incident on the crystal 22a, a double phase conjugate mirror 22m (of FIG. 2) is formed by the reference signal light (Y1) and the guide light (Y3) and the reference signal light is output to the optical antenna 1e as reference signal light (Y1) which is phase-conjugate light.

The output reference signal light is reflected by the reflection unit 4e, then frequency-shifted by the frequency shifting unit 3e, and incident on the crystal 22a as return signal light. Thus, the reference signal light and the return signal light form a double phase conjugate mirror 22p in the crystal 22a and the return signal light (Y2) is emitted to the space 15 from the crystal 22a as phase-conjugate light.

Operation of First Embodiment

Next, a spatial light frequency transmission operation of the system 10 according to the first embodiment will be described with reference to a flowchart shown in FIG. 3. Here, the transceiver 21 will be referred to as a first transceiver 21 and the transceiver 22 will be referred to as a second transceiver 22.

Figure 3:
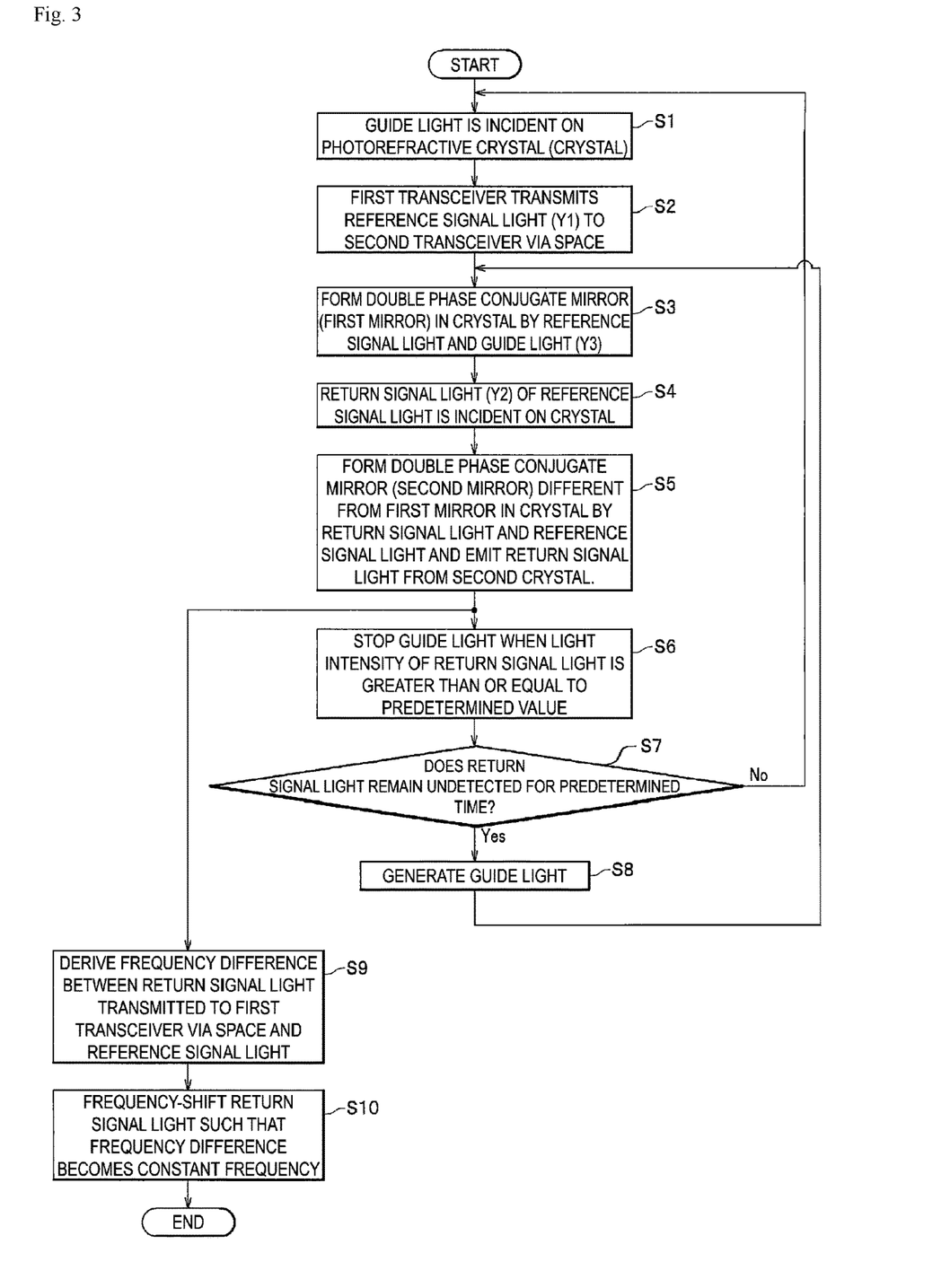
FIG. 3 is a flowchart for explaining an operation of the spatial light frequency transmission system according to the first embodiment.

In step S1 shown in FIG. 3, when guide light indicated by the arrow Y3 is emitted from the guide light source 22c of the second transceiver 22, the guide light is demultiplexed into the optical antenna 1e by the multiplexing/demultiplexing unit 5e and is incident on the photorefractive crystal 22a from the optical antenna 1e.

After that, in step S2, reference signal light emitted from the reference signal source 14 is transmitted from the first transceiver 21 to the second transceiver 22 via the space 15 as indicated by the arrow Y1. It is assumed that a wavefront distortion is caused to the transmitted reference signal light due to the influence of an atmospheric fluctuation during transmission through the space 15.

In step S3, when the reference signal light received by the second transceiver 22 is incident on the crystal 22a, a double phase conjugate mirror 22m (of FIG. 2) is formed in the crystal 22a by scattered light of the incident reference signal light and the guide light that is incident from its reverse direction. By the mirror 22m, the incident reference signal light is emitted to the optical antenna 1e as reference signal light (YT) which is phase-conjugate light that follows the incident direction of the guide light (Y3) in its reverse direction.

In step S4, the optical antenna 1e focuses and couples the reference signal light to the optical fiber 13b via the multiplexing/demultiplexing units 5e and 2e. At this time, the reference signal light split by the multiplexing/demultiplexing unit 2e is reflected by the reflection unit 4e such that the reference signal light is returned and the return signal light (Y2) is emitted to the frequency shifting unit 3e. The return signal light is frequency-shifted by the frequency shifting unit 3e such that it has a small frequency difference (for example, 10 MHz) from the reference signal light and is incident on the crystal 22a from the optical antenna 1e via the multiplexing/demultiplexing units 2e and 5e.

In step S5, the incident return signal light and the reference signal light that is incident from its reverse direction are scattered in the crystal 22a to form a double phase conjugate mirror 22p different from the mirror 22m. The return signal light is emitted to the space 15 from the crystal 22a by the formed mirror 22p as return signal light that is phase-conjugate light that follows the incident direction (YT) of the reference signal light from the space 15 in its reverse direction as indicated by the arrow Y2.

Because the emitted return signal light has been obtained by frequency-shifting and returning the reference signal light having a wavefront distortion incident on the crystal 22a, the emitted return signal light has the same wavefront distortion as that of the reference signal light.

The return signal light emitted from the crystal 22a is transmitted to the first transceiver 21 via the space 15. During this time, the return signal light passes through the atmospheric fluctuation, which has applied the wavefront distortion to the reference signal light, in the reverse direction (in the direction of the arrow Y2). Therefore, a wavefront distortion component due to the atmospheric fluctuation cancels out the wavefront distortion of the return signal light passing through the atmospheric fluctuation, such that the return signal light returns to the original light wave without wavefront distortions after passing through the atmospheric fluctuation.

On the other hand, in step S6, when the signal light detection unit 22g has detected return signal light, the guide light source 22c is stopped to stop the guide light (Y3) under the control of the light source control unit 22i. When the guide light is stopped, the mirror 22m is eliminated from inside of the crystal 22a.

At this time, the guide light is stopped. However, the mirror 22p is still autonomously formed because the mirror 22p is already formed in the crystal 22a by the reference signal light (YT) and the return signal light (Y2) before the guide light is stopped. Therefore, even when the wavefront distortion of the reference signal light incident on the crystal 22a has changed, the return signal light (Y2) which is phase-conjugate light of the reference signal light (YT) having the changed wavefront distortion is emitted from the crystal 22a. This emission is performed such that the return signal light (Y2) follows the incident direction of the reference signal light in its reverse direction. Thus, because the return signal light passes through the atmospheric fluctuation in the reverse direction, the changed wavefront distortion is dynamically canceled out.

In step S7, the light source control unit 22i determines whether or not return signal light on which detection is being performed by the signal light detection unit 22g has remained undetected for a predetermined time. When the determination result is that return signal light has not remained undetected for the predetermined time (No), the process returns to step S1 to continue the processing.

On the other hand, when the reference signal light is cut off due to obstruction of the optical path in the space 15 or the like and thus the determination result is that return signal light has remained undetected for the predetermined time (Yes), the light source control unit 22i activates the guide light source 22c to generate guide light (Y3) in step S8. The generated guide light is split by the multiplexing/demultiplexing unit 5e and incident on the crystal 22a via the optical antenna 1e. After this incidence, the process returns to step S3 to continue the processing.

In step S9, the return signal light (Y2) emitted from the crystal 22a to the space 15 in step S5 is received by the optical antenna Ta of the first transceiver 21. The received return signal light is split into the beat detection unit 4a by the multiplexing/demultiplexing unit 3a via the frequency shifting unit 2a. Because the reference signal light from the reference signal source 14 has been input to the beat detection unit 4a, the beat detection unit 4a obtains the frequency difference between the frequency f1 of the reference signal light and the frequency f2 of the return signal light. The frequency difference is output to the frequency shifting unit 2a.

In step S10, the frequency shifting unit 2a frequency-shifts the return signal light input from the optical antenna Ta such that the frequency difference from the beat detection unit 4a becomes a constant frequency (for example, 10 MHz). The feedback in which the frequency-shifted return signal light is input to the beat detection unit 4a via the multiplexing/demultiplexing unit 3a is repeated to make the frequency difference constant.

Advantages of First Embodiment

Next, advantages of the second transceiver 22 of the system 10 according to the first embodiment will be described. The second transceiver 22 is configured to include the guide light source 22c, the photorefractive crystal 22a, and the frequency control unit 22e.

The guide light source 22c emits guide light (Y3). A mirror 22m is formed in the crystal 22a by scattering of reference signal light (Y1), which has a frequency different from that of the guide light and is incident on the crystal 22a via the space 15 after being transmitted from the first transceiver 21 which is a transceiver on the other side, and the guide light that is incident on the crystal 22a in the reverse direction to that of the reference signal light. The frequency control unit 22e couples the reference signal light emitted from the crystal 22a, which is phase-conjugate light of the guide light generated by the mirror 22m, to the optical fiber 13b.

According to this configuration, when the guide light is incident on the crystal 22a and then the reference signal light is incident on the crystal 22a from the first transceiver 21 via the space 15, the first mirror 22m can be formed in the crystal 22a by scattering of the reference signal light and the guide light. The frequency control unit 22e can couple the reference signal light, which is the phase-conjugate light generated by the first mirror 22m, to the optical fiber.

The frequency control unit 22e causes the reference signal light emitted from the crystal 22a, which is the phase-conjugate light of the guide light generated by the first mirror 22m, to be incident on the crystal 22a as return signal light (Y2) by reflecting and then frequency-shifting the reference signal light such that the frequency of the return signal light (Y2) differs from those of the reference signal light and the guide light. A second mirror 22p (second mirror) is formed in the crystal 22a by scattering of the reference signal light and the return signal light incident on the crystal 22a and the return signal light is emitted to the first transceiver 21 from the crystal 22a as phase-conjugate light of the reference signal light by the second mirror 22p.

According to this configuration, the return signal light obtained by returning and frequency-shifting the reference signal light is transmitted to the first transceiver 21 as phase-conjugate light of the reference signal light by the mirror 22p formed in the crystal 22a. Here, when a wavefront distortion has been caused to the reference signal light to be incident on the crystal 22a due to an atmospheric fluctuation or the like, the return signal light equivalent to the reference signal light passes through the atmospheric fluctuation in the reverse direction. Therefore, a wavefront distortion component due to the atmospheric fluctuation cancels out the wavefront distortion of the return signal light, such that the return signal light returns to the original light wave without wavefront distortions after passing through the atmospheric fluctuation.

The second transceiver 22 is configured to further include the guide light control unit 22b that performs control for stopping the guide light source 22c when return signal light has been detected.

According to this configuration, light waves generated by the first mirror 22m formed by the reference signal light and the guide light become a noise source. However, because the guide light control unit 22b can stop the guide light source 22c, the first mirror 22m which is a noise source can be eliminated by stopping the guide light source 22c to stop the guide light.

The guide light control unit 22b is configured to perform control for activating the guide light source 22c when the return signal light on which detection is being performed has remained undetected for a predetermined time.

According to this configuration, when the reference signal light is cut off due to obstruction of the optical path in the space 15 or the like and thus the return signal light is stopped, the mirror 22p in the crystal 22a is eliminated. However, the guide light source 22c can be activated to generate guide light. Thus, after a mirror 22m is formed in the crystal 22a again, a mirror 22p can be formed and return signal light can be emitted to the space 15.

Configuration of Second Embodiment

Figure 4:
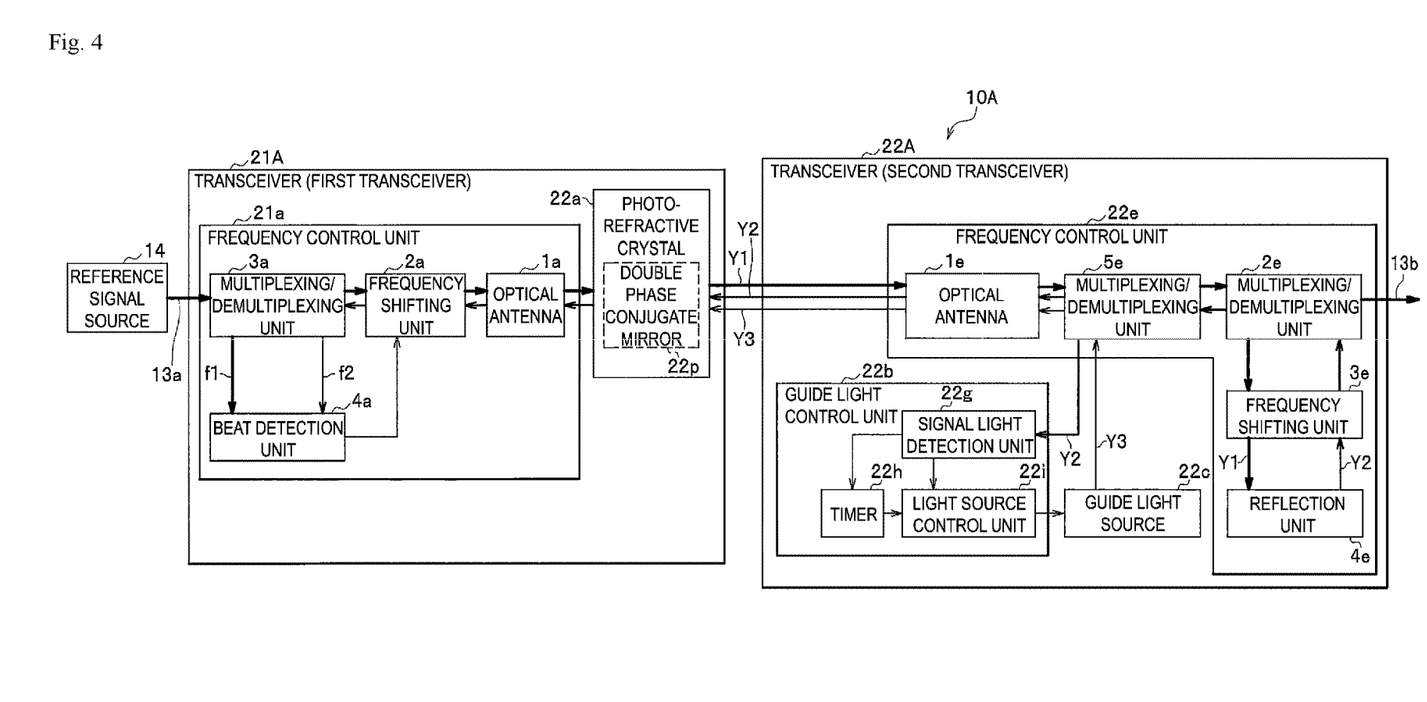
FIG. 4 is a block diagram illustrating a configuration of a spatial light frequency transmission system according to a second embodiment of the present invention.

FIG. 4 is a block diagram illustrating a configuration of a spatial light frequency transmission system according to a second embodiment of the present invention.

The difference of a spatial light frequency transmission system 10A illustrated in FIG. 4 from the system 10 (of FIG. 1) of the first embodiment is that the photorefractive crystal 22a provided in the second transceiver 22 (of FIG. 1) has been relocated to a first transceiver 21A. The crystal 22a is provided such that it is connected by an optical fiber to an input/output side of the optical antenna 1a in the first transceiver 21A through which input and output from and to the space 15 are performed. Thus, the first transceiver 22A includes a guide light control unit 22b, a guide light source 22c, and a frequency control unit 22e.

Operation of Second Embodiment

Next, a spatial light frequency transmission operation of the system 10A according to the second embodiment will be described with reference to a flowchart shown in FIG. 5. Here, the transceiver 21 will be referred to as a first transceiver 21 and the transceiver 22 will be referred to as a second transceiver 22.

Figure 5:
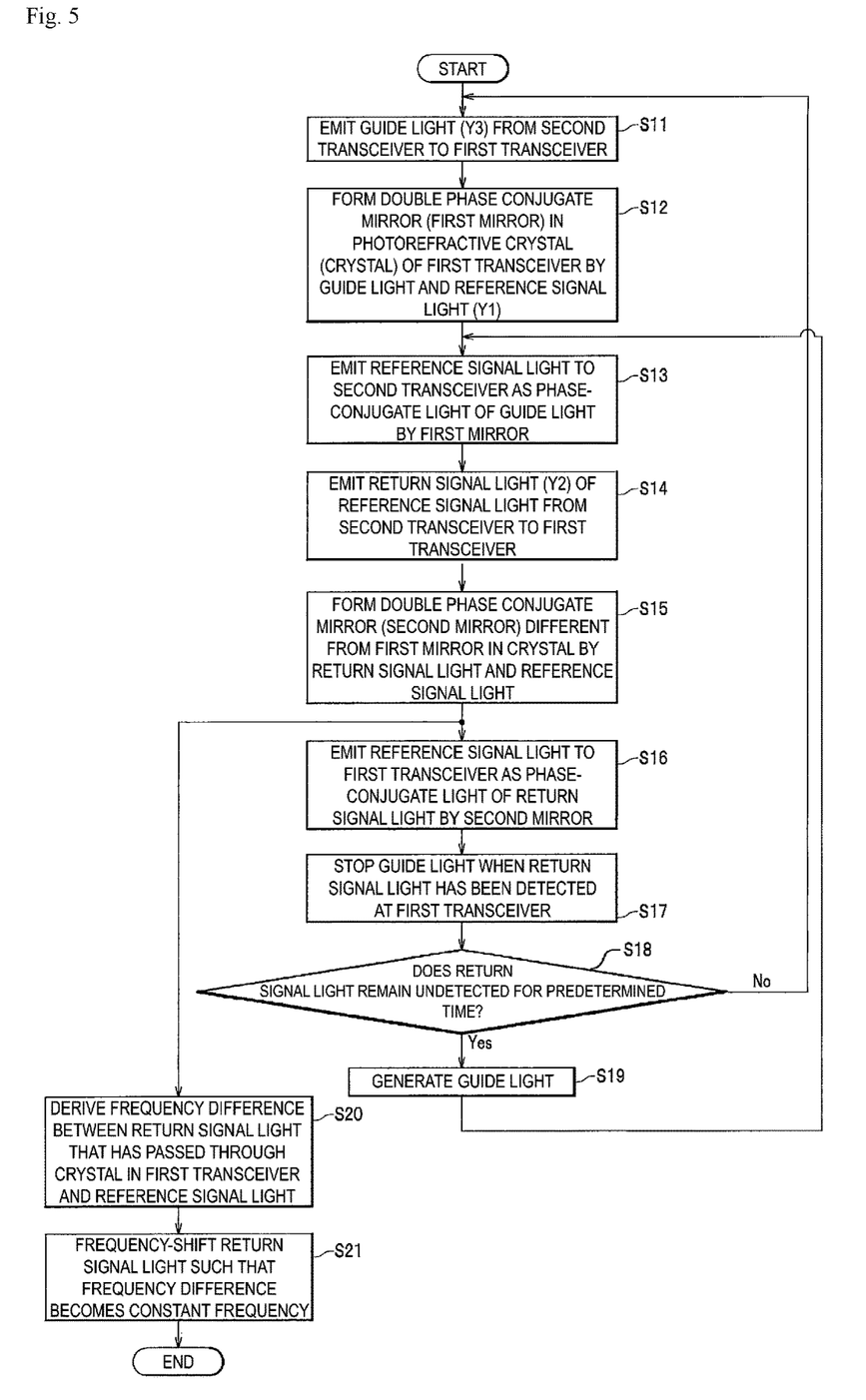
FIG. 5 is a flowchart for explaining an operation of the spatial light frequency transmission system according to the second embodiment.

In step S11 shown in FIG. 5, guide light (Y3) is emitted from the guide light source 22c of the second transceiver 22. This guide light is split into the optical antenna 1e by the multiplexing/demultiplexing unit 5e and is emitted from the optical antenna 1e to the first transceiver 21A via the space 15 as indicated by an arrow Y3.

In step S12, when the guide light is incident on the crystal 22a of the first transceiver 21A, a mirror 22m is formed in the crystal 22a by scattering of the guide light and the reference signal light that is incident from its reverse direction.

In step S13, the reference signal light is emitted to the second transceiver 22A via the space 15 by the mirror 22m as reference signal light that is phase-conjugate light of the guide light that follows the incident direction of the guide light (Y3) in its reverse direction as indicated by the arrow YT. It is assumed that a wavefront distortion is caused to the emitted reference signal light due to an atmospheric fluctuation.

In step S14, the emitted reference signal light is received by the optical antenna 1e of the second transceiver 22A. The optical antenna 1e focuses and couples the reference signal light to the optical fiber 13b via the multiplexing/demultiplexing units 5e and 2e. At this time, the reference signal light split by the multiplexing/demultiplexing unit 2e is reflected by the reflection unit 4e such that the reference signal light is returned and further frequency-shifted by the frequency shifting unit 3e such that the return signal light has a small frequency difference (for example, 10 MHz) from the reference signal light. The return signal light is then emitted from the optical antenna 1e to the first transceiver 21 via the multiplexing/demultiplexing units 2e and 5e and then via the space 15 as indicated by an arrow Y2.

This emitted return signal light has the same wavefront distortion as that of the reference signal light. However, because the return signal light passes through the atmospheric fluctuation, which has applied the wavefront distortion to the reference signal light, in the reverse direction, the wavefront distortions are canceled out, such that the return signal light returns to the original light wave without wavefront distortions after passing through the atmospheric fluctuation.

In step S15, the return signal light emitted in step S14 is incident on the crystal 22a. The incident return signal light and the reference signal light that is incident from its reverse direction are scattered in the crystal 22a to form a double phase conjugate mirror 22p different from the mirror 22m.

In step S16, the reference signal light (YT) is emitted to the first transceiver 22A by the mirror 22p as phase-conjugate light of the return signal light (Y2).

On the other hand, in step S17, when the signal light detection unit 22g has detected return signal light, the guide light source 22c is stopped to stop the guide light (Y3) under the control of the light source control unit 22i. When the guide light is stopped, the mirror 22m is eliminated from inside of the crystal 22a of the first transceiver 21A.

In this case, the mirror 22p is still autonomously formed because the mirror 22p is already formed in the crystal 22a by the reference signal light (YT) and the return signal light (Y2). Thus, even when the wavefront distortion of the reference signal light emitted to the space 15 from the crystal 22a has changed, the changed wavefront distortion is dynamically canceled out because the return signal light (Y2) which is phase-conjugate light of the reference signal light (YT) having the changed wavefront distortion passes through the atmospheric fluctuation in the reverse direction to that of the reference signal light.

In step S18, the light source control unit 22i determines whether or not return signal light (Y2) on which detection is being performed by the signal light detection unit 22g has remained undetected for a predetermined time. When the determination result is that return signal light has not remained undetected for the predetermined time (No), the process returns to step S12 to continue the processing.

On the other hand, when the reference signal light is cut off due to obstruction of the optical path in the space 15 or the like and thus the determination result is that return signal light has remained undetected for the predetermined time (Yes), the light source control unit 22i activates the guide light source 22c to generate guide light (Y3) in step S19. This guide light is split by the multiplexing/demultiplexing unit 5e and incident on the crystal 22a of the first transceiver 21 from the optical antenna 1e via the space 15. After this incidence, the process returns to step S12 to continue the processing.

On the other hand, in step S20, the return signal light (Y2) incident on the crystal 22a in step S15 is split into the beat detection unit 4a from the optical antenna T a by the multiplexing/demultiplexing unit 3a via the frequency shifting unit 2a. The beat detection unit 4a obtains the frequency difference between the frequency f1 of the reference signal light from the reference signal source 14 and the frequency f2 of the return signal light. The frequency difference is output to the frequency shifting unit 2a.

In step S21, the frequency shifting unit 2a frequency-shifts the return signal light from the optical antenna Ta such that the frequency difference becomes a constant frequency (for example, 10 MHz). The feedback in which the frequency-shifted return signal light is input to the beat detection unit 4a is repeated to make the frequency difference constant.

Advantages of Second Embodiment

Next, advantages of the system 10A according to the second embodiment will be described. The first transceiver 21A of the system 10A includes the photorefractive crystal 22a and the second transceiver 22A includes the guide light source 22c and the frequency control unit 22e.

The first transceiver 21 includes the photorefractive crystal 22a and emits reference signal light of a reference optical frequency to the space via the photorefractive crystal 22a. The second transceiver 22 includes the guide light source 22c that emits guide light of a frequency different from that of the reference signal light and the frequency control unit 22e that transmits the guide light from the guide light source 22c to the first transceiver 21A via the space.

When the guide light transmitted from the frequency control unit 22e is incident on the photorefractive crystal 22a, a first double phase conjugate mirror 22m is formed in the crystal 22a by scattering of the guide light and the reference signal light that is incident from its reverse direction. When the second transceiver 22A has received the reference signal light which is phase-conjugate light of the guide light generated by the mirror 22m, the frequency control unit 22e couples the received reference signal light to the optical fiber 13b. The reference signal light is incident on the crystal 22a via the space as return signal light by reflecting and then frequency-shifting the reference signal light such that the frequency of the return signal light differs from those of the reference signal light and the guide light. A mirror 22p is formed by scattering of the reference signal light and the return signal light incident on the crystal 22a and the reference signal light is emitted to the second transceiver 22A via the space 15 as phase-conjugate light of the return signal light by the mirror 22p.

According to this configuration, when the reference signal light from one direction is incident on the crystal 22a, a mirror 22m can be formed in the crystal 22a by scattering of the reference signal light and the guide light and the reference signal light can be coupled to the optical fiber 13b of the second transceiver 22A on the receiving side.

After the reference signal light is transmitted to the second transceiver 22A as phase-conjugate light of the return signal light by the mirror 22p of the first transceiver 21, it is returned to the first transceiver 21A from the second transceiver 22A as the return signal light. Here, when a wavefront distortion has been caused to the reference signal light, the same wavefront distortion is caused to the return signal light. Therefore, when the return signal light has passed through the atmospheric fluctuation in the reverse direction, a wavefront distortion component due to the atmospheric fluctuation cancels out the wavefront distortion of the return signal light, such that the return signal light returns to the original light wave without wavefront distortions after passing through the atmospheric fluctuation.

Advantages (1) A transceiver includes a guide light source configured to emit guide light, a photorefractive crystal in which a first double phase conjugate mirror is formed by scattering of reference signal light, which has a frequency different from that of the guide light and is incident on the photorefractive crystal via space after being transmitted from a transceiver on another side, and the guide light that is incident on the photorefractive crystal in a reverse direction to that of the reference signal light, and a frequency control unit configured to couple the reference signal light emitted from the photorefractive crystal, which is phase-conjugate light of the guide light by the first double phase conjugate mirror, to an optical fiber.

According to this configuration, when the guide light is incident on the photorefractive crystal (crystal) and then the reference signal light is incident on the crystal via space after being transmitted from the transceiver on the other side, the first double phase conjugate mirror (first mirror) can be formed in the crystal by scattering of the reference signal light and the guide light. The frequency control unit can couple the reference signal light, which is the phase-conjugate light generated by the first mirror, to the optical fiber.

(2) In the transceiver according to the above (1), the frequency control unit causes return signal light, to be incident on the photorefractive crystal, obtained by shifting a frequency of the reference signal light emitted from the photorefractive crystal, which is the phase-conjugate light of the guide light by the first double phase conjugate mirror, after reflection to be different from those of the reference signal light and the guide light, and a second double phase conjugate mirror is formed in the photorefractive crystal by scattering of the return signal light and the reference signal light incident on the photorefractive crystal, and the return signal light is emitted to the transceiver on the other side from the photorefractive crystal as phase-conjugate light of the reference signal light by the second double phase conjugate mirror.

According to this configuration, the return signal light obtained by returning and frequency-shifting the reference signal light is transmitted to the transceiver on the other side as phase-conjugate light of the reference signal light by the second double phase conjugate mirror (second mirror) formed in the crystal. Here, when a wavefront distortion has been caused to the reference signal light to be incident on the crystal due to an atmospheric fluctuation or the like, the return signal light equivalent to the reference signal light passes through the atmospheric fluctuation in the reverse direction. Therefore, a wavefront distortion component due to the atmospheric fluctuation cancels out the wavefront distortion of the return signal light, such that the return signal light returns to the original light wave (reference signal light) without wavefront distortions after passing through the atmospheric fluctuation.

(3) The transceiver according to the above (2) further includes a guide light control unit configured to perform control for stopping the guide light source when the return signal light is detected.

According to this configuration, light waves generated by the first mirror formed by the reference signal light and the guide light become a noise source. However, because the guide light control unit can stop the guide light source, the first mirror which is a noise source can be eliminated by stopping the guide light source to stop the guide light.

(4) In the transceiver according to the above (3), the guide light control unit performs control for activating the guide light source when the return signal light being detected remains undetected for a predetermined time.

According to this configuration, when the reference signal light is cut off due to obstruction of the optical path in space or the like and thus the return signal light is stopped, the second mirror in the crystal is eliminated. However, the guide light source can be activated to generate guide light. Thus, after a first mirror is formed in the crystal again, a second mirror can be formed and return signal light can be emitted to space.

(5) A spatial light frequency transmission system includes the transceiver according to any one of the above (1) to (4).

According to this configuration, reference signal light from one direction which is directed from the transmitting side toward the receiving side can be incident on the photorefractive crystal to form a double phase conjugate mirror, whereby wavefront correction of the reference signal light can be performed and the reference signal light can be coupled to an optical fiber on the receiving side.

(6) A spatial light frequency transmission system includes a first transceiver, which emits reference signal light of a reference optical frequency to space via the photorefractive crystal, including a photorefractive crystal, and a second transceiver including a guide light source configured to emit guide light having a frequency different from that of the reference signal light and a frequency control unit configured to transmit the guide light from the guide light source to the first transceiver via space, in which the first transceiver forms, when the guide light transmitted from the frequency control unit is incident on the photorefractive crystal, a first double phase conjugate mirror in the photorefractive crystal by scattering of the guide light and the reference signal light that is incident from a reverse direction to that of the guide light, the second transceiver couples, when the reference signal light which is phase-conjugate light of the guide light by the first double phase conjugate mirror is received, the received reference signal light to an optical fiber using the frequency control unit and transmits, via space, return signal light obtained by shifting a frequency of the reference signal light after reflection to be different from those of the reference signal light and the guide light, and the first transceiver forms, when the return signal light transmitted from the second transceiver is incident on the photorefractive crystal, a second double phase conjugate mirror in the photorefractive crystal by scattering of the return signal light that is incident and the reference signal light and emits the reference signal light to the second transceiver as phase-conjugate light of the return signal light by the second double phase conjugate mirror.

According to this configuration, when the reference signal light from one direction is incident on the photorefractive crystal, a double phase conjugate mirror can be formed in the photorefractive crystal by scattering of the reference signal light and the guide light and the reference signal light can be coupled to the optical fiber of the second transceiver on the receiving side.

After the reference signal light is transmitted to the second transceiver as phase-conjugate light of the return signal light by the second mirror of the first transceiver, it is returned to the first transceiver from the second transceiver as the return signal light. Here, when a wavefront distortion has been caused to the reference signal light, the same wavefront distortion is caused to the return signal light. Therefore, when the return signal light has passed through the atmospheric fluctuation in the reverse direction, a wavefront distortion component due to the atmospheric fluctuation cancels out the wavefront distortion of the return signal light, such that the return signal light returns to the original light wave without wavefront distortions after passing through the atmospheric fluctuation.

(7) A spatial light frequency transmission method includes emitting guide light from a guide light source, forming a first double phase conjugate mirror in a photorefractive crystal by scattering of reference signal light, which has a frequency different from that of the guide light and is incident on the photorefractive crystal via space after being transmitted from a transceiver on another side, and the guide light that is incident on the photorefractive crystal in a reverse direction to that of the reference signal light, coupling the reference signal light emitted from the photorefractive crystal, which is phase-conjugate light of the guide light by the first double phase conjugate mirror, to an optical fiber, causing return signal light, to be incident on the photorefractive crystal, obtained by shifting a frequency of the reference signal light, which is the phase-conjugate light of the guide light by the first double phase conjugate mirror, after reflection to be different from those of the reference signal light and the guide light, and forming a second double phase conjugate mirror in the photorefractive crystal by scattering of the return signal light and the reference signal light incident on the photorefractive crystal, and emitting the return signal light to the transceiver on the other side from the photorefractive crystal as phase-conjugate light of the reference signal light by the second double phase conjugate mirror.

According to this method, the same operational effects as in the above (5) can be achieved.

(8) A spatial light frequency transmission method includes emitting reference signal light of a reference optical frequency from a first transceiver to a second transceiver via a photorefractive crystal and space, emitting, by the second transceiver, guide light having a frequency different from that of the reference signal light and transmitting the guide light to the first transceiver via space, forming, when the guide light transmitted from the second transceiver is incident on the photorefractive crystal, a first double phase conjugate mirror in the photorefractive crystal by scattering of the guide light and the reference signal light that is incident from a reverse direction to that of the guide light, coupling, when the second transceiver receives the reference signal light which is phase-conjugate light of the guide light by the first double phase conjugate mirror, the received reference signal light to an optical fiber and causing return signal light, to be incident on the photorefractive crystal via space, obtained by shifting a frequency of the reference signal light after reflection to be different from those of the reference signal light and the guide light, and forming a second double phase conjugate mirror in the photorefractive crystal by scattering of the return signal light that is incident and the reference signal light and emitting the reference signal light to the second transceiver as phase-conjugate light of the return signal light by the second double phase conjugate mirror.

According to this method, the same operational effects as in the above (6) can be achieved.

Other appropriate changes can be made to the specific configurations without departing from the spirit of the present invention. In the spatial light frequency transmission system described above, internal processing of the transmitter and the receiver or the transceiver may be performed through electrical processing by photoelectric conversion, while spatial transmission is performed using optical signals.

REFERENCE SIGNS LIST 1a, 1e Optical antenna
2a, 3e Frequency shifting unit
3a, 5e, 2e Multiplexing/demultiplexing unit
4a Beat detection unit
4e Reflection unit
10, 10A Spatial light frequency transmission system
13a, 13b Optical fiber
14 Reference signal source
15 Space
21a, 22e Frequency control unit
22c Guide light source
22g Signal light detection unit
22h Timer
22i Light source control unit
21, 21A Transceiver (first transceiver)
22, 22A Transceiver (second transceiver)

The invention claimed is:

1. A transceiver comprising:
a guide light source configured to emit guide light;
a photorefractive crystal where a first double phase conjugate mirror is formed by scattering of reference signal light and the guide light, the reference signal light having a first frequency different from a second frequency of the guide light and being incident on the photorefractive crystal via space after being transmitted from a transceiver on another side, the guide light being incident on the photorefractive crystal in a reverse direction to a direction of the reference signal light; and
a frequency control unit configured to couple the reference signal light being phase-conjugate light of the guide light by the first double phase conjugate mirror emitted from the photorefractive crystal, to an optical fiber.

2. The transceiver according to claim 1, wherein the frequency control unit causes return signal light, to be incident on the photorefractive crystal, obtained by shifting a third frequency of the reference signal light emitted from the photorefractive crystal that is the phase-conjugate light of the guide light by the first double phase conjugate mirror, after reflection to be different from the first frequency of the reference signal light and the second frequency of the guide light, and a second double phase conjugate mirror is formed in the photorefractive crystal by scattering of the return signal light and the reference signal light incident on the photorefractive crystal, and the return signal light is emitted to the transceiver on the other side from the photorefractive crystal as phase-conjugate light of the reference signal light by the second double phase conjugate mirror.

3. The transceiver according to claim 2, further comprising a guide light control unit configured to perform control for stopping the guide light source when the return signal light is detected.

4. The transceiver according to claim 3, wherein the guide light control unit performs control for activating the guide light source when the return signal light being detected remains undetected for a predetermined time.

5. A spatial light frequency transmission system including the transceiver according to claim 1.

6. A spatial light frequency transmission system comprising:
   a first transceiver including a photorefractive crystal, the first transceiver being configured to emit reference signal light of a reference optical frequency to space via the photorefractive crystal; and
   a second transceiver including a guide light source configured to emit guide light having a first frequency different from a second frequency of the reference signal light and a frequency control unit configured to transmit the guide light from the guide light source to the first transceiver via space,
   wherein the first transceiver forms, when the guide light transmitted from the frequency control unit is incident on the photorefractive crystal, a first double phase conjugate mirror in the photorefractive crystal by scattering of the guide light and the reference signal light that is incident from a reverse direction to a direction of the guide light,
   the second transceiver couples, when the reference signal light that is phase-conjugate light of the guide light by the first double phase conjugate mirror is received, the reference signal light received to an optical fiber using the frequency control unit and transmits, via space, return signal light obtained by shifting a third frequency of the reference signal light after reflection to be different from the second frequency of the reference signal light and the first frequency of the guide light, and
   the first transceiver forms, when the return signal light transmitted from the second transceiver is incident on the photorefractive crystal, a second double phase conjugate mirror in the photorefractive crystal by scattering of the return signal light that is incident and the reference signal light and emits the reference signal light to the second transceiver as phase-conjugate light of the return signal light by the second double phase conjugate mirror.

7. The spatial light frequency transmission system according to claim 6, wherein the frequency control unit causes the return signal light, to be incident on the photorefractive crystal, obtained by shifting the third frequency of the reference signal light emitted from the photorefractive crystal that is the phase-conjugate light of the guide light by the first double phase conjugate mirror, after reflection to be different from the first frequency of the reference signal light and the second frequency of the guide light, and the second double phase conjugate mirror is formed in the photorefractive crystal by scattering of the return signal light and the reference signal light incident on the photorefractive crystal, and the return signal light is emitted to the transceiver on the other side from the photorefractive crystal as the phase-conjugate light of the reference signal light by the second double phase conjugate mirror.

8. The spatial light frequency transmission system according to claim 6, further comprising a guide light control unit configured to perform control for stopping the guide light source when the return signal light is detected.

9. The spatial light frequency transmission system according to claim 8, wherein the guide light control unit performs control for activating the guide light source when the return signal light being detected remains undetected for a predetermined time.

10. A spatial light frequency transmission method comprising:
    emitting guide light from a guide light source;
    forming a first double phase conjugate mirror in a photorefractive crystal by scattering of reference signal light and the guide light, the reference signal light having a first frequency different from a second frequency of the guide light and being incident on the photorefractive crystal via space after being transmitted from a transceiver on another side, the guide light being incident on the photorefractive crystal in a reverse direction to a direction of the reference signal light;
    coupling the reference signal light being phase-conjugate light of the guide light by the first double phase conjugate mirror emitted from the photorefractive crystal, to an optical fiber;
    causing return signal light, to be incident on the photorefractive crystal, obtained by shifting a third frequency of the reference signal light that is the phase-conjugate light of the guide light by the first double phase conjugate mirror, after reflection to be different from the first frequency of the reference signal light and the second frequency of the guide light; and
    forming a second double phase conjugate mirror in the photorefractive crystal by scattering of the return signal light and the reference signal light incident on the photorefractive crystal, and emitting the return signal light to the transceiver on the other side from the photorefractive crystal as phase-conjugate light of the reference signal light by the second double phase conjugate mirror.

11. The spatial light frequency transmission method according to claim 10, further comprising:
    controlling for stopping the guide light source when the return signal light is detected.

12. The spatial light frequency transmission method according to claim 11, further comprising:
    controlling for activating the guide light source when the return signal light being detected remains undetected for a predetermined time.

* * * * *